April 2, 1940.  C. A. DE GIERS  2,195,813
RHEOSTAT ADJUSTMENT
Filed June 19, 1937  2 Sheets-Sheet 1
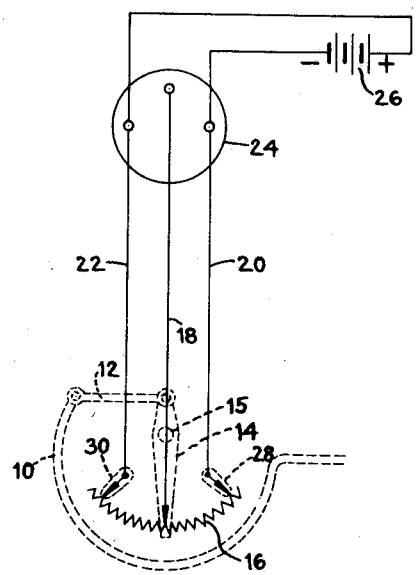
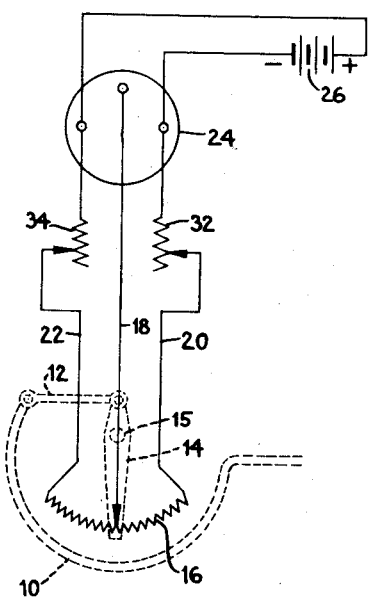
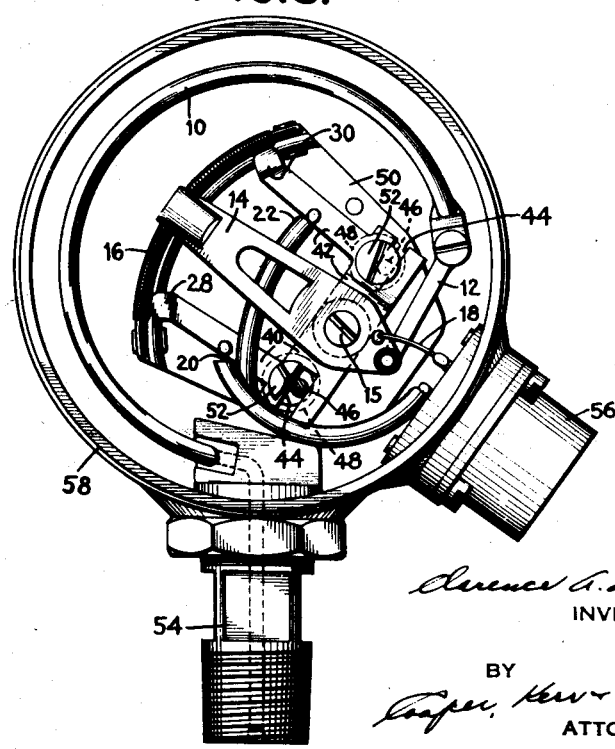
Clarence A. De Giers
INVENTOR
BY
ATTORNEYS April 2, 1940.　　　C. A. DE GIERS　　　2,195,813

RHEOSTAT ADJUSTMENT

Filed June 19, 1937　　　2 Sheets-Sheet 2

INVENTOR

BY

ATTORNEYS

Patented Apr. 2, 1940

2,195,813

UNITED STATES PATENT OFFICE 2,195,813

RHEOSTAT ADJUSTMENT

Clarence A. de Giers, Long Island City, N. Y., assignor to The Liquidometer Corporation, Long Island City, N. Y., a corporation of Delaware Application June 19, 1937, Serial No. 149,172

6 Claims. (Cl. 201—55)

This invention pertains to a rheostat or potentiometer for controlling a remote indicator, and an object of the invention is to provide means for varying the resistance of a single resistance strip in order to control the pointer positions of the indicator in relation to the first and last graduations of the dial for a given movement of a prime mover.

The invention is intended for use in an electric circuit of the conventional type, using a resistance strip and a movable contact shoe on the strip for varying the amount of current in order to operate the indicator, and in cases where it is desirable to have an electrical resistance in one or more of the wires leading from the resistance strip to the indicator. For instance, in a remote controlled pressure gauge, if a Bourdon tube be used as a means for moving the shoe over the resistance strip, it is difficult to construct a tube that will function with precision over a given range, therefore a means for adjustment is important. Also, there is an advantage in being able to make electrical adjustment to correct variations in the electrical indicator, especially of the ratio type. In other words, commercially made electric indicators often require slightly more or less current to give a full pointer deflection.

Also, in a float-controlled remote indicating tank contents gauge it is difficult to construct a float mechanism that will move the shoe over the rheostat strip exactly as required. Slight variations in the tank depth will cause the float mechanism to travel more or less and consequently cause the shoe to travel accordingly, with the result that the indication at the electrical indicator would be in error, and in the absence of means for making correction for such errors the float mechanism would have to be altered to obtain the correct amount of shoe travel. Such an undertaking would be expensive and difficult.

The present invention affords a positive and quick means for varying the amount of resistance at the resistance strip itself in order to give accurate pointer position in relation to the two ends of the graduated scale of an indicator. Compactness and simplicity contribute to the importance of the invention. It is primarily intended for use in aircraft instruments.

Further and other objects and advantages will be apparent from the specification and claims, and from the accompanying drawings which illustrate what is now considered the preferred embodiment of the invention.

Figs. 1 and 2 are explanatory circuit diagrams.

Fig. 3 shows a mechanical embodiment of the invention.

Figure 4:
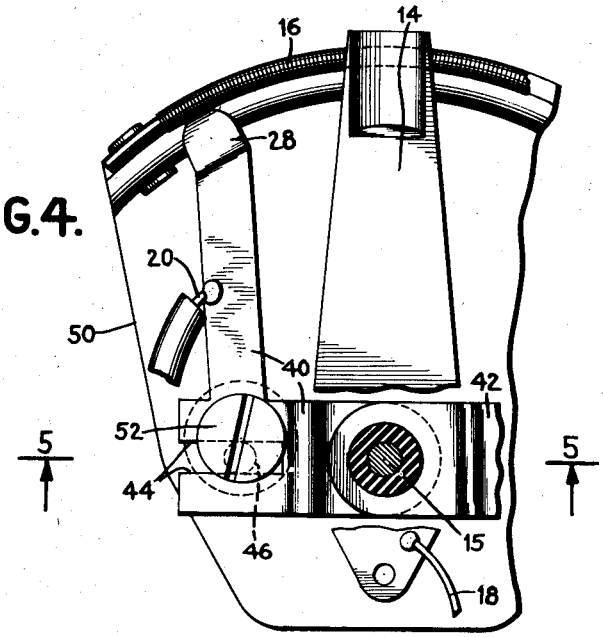
Fig. 4 is an enlarged detail of Fig. 3.

Fig. 1 is a wiring diagram with a Bourdon tube 10 as the prime mover. The free end of the tube is connected by a link 12 to a rider shoe 14 pivoted at 15. This shoe 14 is in contact with resistor strip 16. The circuit shown is a conventional potentiometer hook-up having one lead wire 18 in contact with the rider shoe 14 and wires 20 and 22 connected one near each end of the resistance strip 16. All three wires are connected to the indicator 24. A battery 26 is shown as the source of current. Adjustment shoes 28, 30 connect wires 20, 22, respectively, to the resistance strip, thereby combining the adjustment feature of the invention directly with the resistor. The arrangement is compact and also provides a surface for the shoe to ride on beyond the point where the indicator should show either the first or last graduation on the indicator dial.

Adjustments 28, 30 could be placed in leads 20 and 22 remote from resistor strip 16 as shown at 32, 34, in Fig. 2. However, if that is done, and should the shoe 14 travel too far, or more one way than the other, the shoe would pass off the end of the resistance strip and the indicator would be cut out as if a switch in the circuit were open. So the invention involves a means for varying the resistance between the resistance strip and the indicator right at the resistance strip.

In operation, the above described adjustment feature is utilized as follows: the electric indicator is made to give a certain pointer deflection in relation to a given amount of current. The amount of current is varied in order to move the pointer. The electrical resistance value of the resistor strip must be equal to the resistance value of the indicator. Therefore, shoe 14, Fig. 2, in order for the pointer to move from one end of the scale to the other, must travel from end to end of the resistor strip 16. If the action of the Bourdon tube should be such that the shoe 14 would travel more one way than the other, the shoe would pass beyond one end of the resistor strip and open the circuit; also, if the shoe travel were more one way than the other, one end of the resistance strip would remain ineffective, resulting in an erroneous indication. With the arrangement shown in Fig. 1 the resistance strip is made longer and with more resistance than required to supply energy suitable for all deflection of the indicator pointer, so that if the shoe travel is more one way than the other, the adjusters 28, 30 are moved to short out a portion of the resistance strip on each end, leaving the excess windings of the resistor strip ineffective, at the same time leaving circuit resistance to control the movement of the pointer. Furthermore, the extra length of the resistor strip provides a uniform surface for the shoe 14 to ride on in case of shock or overload on the Bourdon tube.

The adjustment feature is not limited to correcting for unequal shoe travel on the resistance strip. It provides a means for adjustment of the pointer travel in relation to the amount of shoe travel.

When the shoe travel is short or long, that is, if the Bourdon tube or float which moves the shoe is not sufficient to move the shoe over enough of the resistor strip to move the pointer to indicate the first and last mark on the indicator scale, adjustor 28 or 30 is moved to increase or decrease the resistance sufficiently to affect the pointer the required amount.

Figure 5:
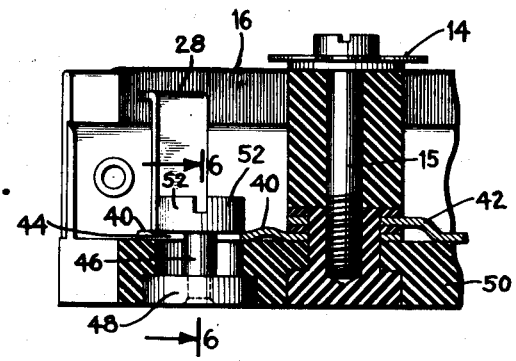
Fig. 5 is a view on line 5—5 of Fig. 4.
Figure 6:
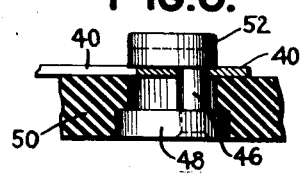
Fig. 6 is a view on line 6—6 of Fig. 5.

With this adjustment arrangement the actuating mechanism and electrical indicators can be made within the range of ordinary commercial tolerances and yet a high degree of accuracy can be obtained. The usefulness of the invention does not stop when the device is first installed, but is useful to correct for changes in the flexing of the Bourdon tube as the metal hardens during use, and further, if, after a device has been in service for a time it becomes necessary to replace an indicator with one having slightly different resistance characteristics, adjustments can be readily made to equalize the pointer travel with the movement of the power element. In the mechanical embodiment disclosed in the drawings, the elements already described are designated by the same reference numerals as in Figs. 1 and 2. Other mechanical details are as follows: adjustor shoes 28 and 30 are carried on L-shaped arms 40, 42, respectively, both pivoted around 15, as best shown in Figs. 4, 5 and 6. Suitable provisions are made for electric insulation at the hub, as shown in Fig. 5. Each arm 40 and 42 is slotted as at 44 to accommodate a crank pin 46, set off center in a disk 48 rotatable in a recess on the non-conducting base 50 on which the mechanism is assembled. On the upper end of pin 46 is a slotted head 52 concentric with disk 48. A screw driver may be used to rotate 52 and 48 to cause crank pin 46 to move arm 40 or 42 about center 15 in order to adjust the position of shoe 28 or 30 with reference to resistor 16.

A suitable fitting 54 (Fig. 3) serves to connect the instrument to the source of pressure, and a socket 56 provides for the electrical connections. A case 58 encloses the mechanism.

It is to be understood that the invention is not limited to the specific embodiment herein illustrated and described, but may be used in other ways without departure from its spirit as defined by the following claims.

I claim:

1. In a device of the class described, in combination, a resistance strip, a contact shoe movable in a certain plane along said strip under control of a prime mover, adjustor shoes in electrical contact with said strip at each end thereof and movable with respect thereto in a plane preventing contact with the contact shoe during movement of the contact shoe along the resistance strip, and means for manually adjusting said adjustor shoes on said strip for varying the effective range of electrical resistance in said strip in accordance with the movement of said prime mover.

2. In a device of the class described, in combination, an arcuate resistance strip, a contact shoe pivoted at the center of said arc and movable in a certain plane along said strip under control of a prime mover, adjustor shoes in electrical contact with said strip near the ends thereof and movable with respect in a separate plane to prevent contact with the contact shoe during movement of the contact shoe along the resistance strip, and means for manually adjusting said adjustor shoes on said strip for varying the effective range of electrical resistance in said strip in accordance with the movement of said prime mover.

3. The invention set forth in claim 2 in which said adjustor shoes are carried on arms pivoted at said center and in which means is provided for manually adjusting said arms.

4. The invention set forth in claim 2 in which said adjustor shoes are carried on arms pivoted at said center, said arms being each individually adjustable by an eccentric device under control of the operator.

5. The invention set forth in claim 2 in which said adjustor shoes are carried on slotted arms pivoted at said center, said arms being individually adjustable by crank pins in their respective slots.

6. The invention set forth in claim 2 in which said adjuster shoes are carried on L-shaped arms slotted at the angle of the L, said arms being individually adjustable by crank pins in their respective slots.

CLARENCE A. DE GIERS.